United States Patent [19]

Masui

[11] Patent Number: 5,730,030

[45] Date of Patent: Mar. 24, 1998

[54] SHIFTING APPARATUS FOR BICYCLES HAVING A BRAKE OPERATING UNIT DISPOSED BETWEEN FIRST AND SECOND SHIFTING LEVERS

[75] Inventor: Takuji Masui, Sakai, Japan

[73] Assignee: Shimano, Inc., Osaka, Japan

[21] Appl. No.: 588,659

[22] Filed: Jan. 19, 1996

[51] Int. Cl.$^6$ .................................................. B60K 20/02
[52] U.S. Cl. ......................... 74/475; 74/489; 74/502.2
[58] Field of Search ............................... 192/43.1; 74/475, 74/489, 502.2, 142

[56] References Cited

U.S. PATENT DOCUMENTS

| | | | |
|---|---|---|---|
| 4,319,673 | 3/1982 | Kojima | 192/4 R |
| 4,840,081 | 6/1989 | Nagano | 74/489 |
| 5,052,241 | 10/1991 | Nagano | 74/475 |
| 5,203,213 | 4/1993 | Nagano | 74/475 |
| 5,213,005 | 5/1993 | Nagano | 74/502.2 |
| 5,361,645 | 11/1994 | Feng | 74/502.2 |
| 5,429,012 | 7/1995 | Ikeda | 74/502.2 |
| 5,564,310 | 10/1996 | Kishimoto | 74/502.2 |

*Primary Examiner*—Charles A. Marmor
*Assistant Examiner*—David M. Fenstermacher
*Attorney, Agent, or Firm*—James A. Deland

[57] ABSTRACT

An apparatus for operating a bicycle transmission shifting device having an operating component for mounting to a bicycle in close proximity to a brake operating unit for alternately pulling and releasing a transmission element, a first lever is mounted to the operating component for movement which causes the operating component to pull the transmission element, and a second lever is mounted to the operating component for movement which causes the operating component to release the transmission element. The first lever and the second lever are mounted to the operating component so that the brake operating unit is disposed between the first lever and the second lever when the shifting device is mounted to the bicycle. In order to be able to construct the shifting device with only a single pawl for the release mechanism, the takeup element for the transmission element includes a control member having a plurality of position retaining teeth for engaging the single release pawl, wherein a pitch between at least two pairs of the plurality of position retaining teeth is a constant value. To accommodate the varying cable pull requirements of an index shifting system, the cable winding surface of the takeup element has a nonuniform shape.

10 Claims, 6 Drawing Sheets

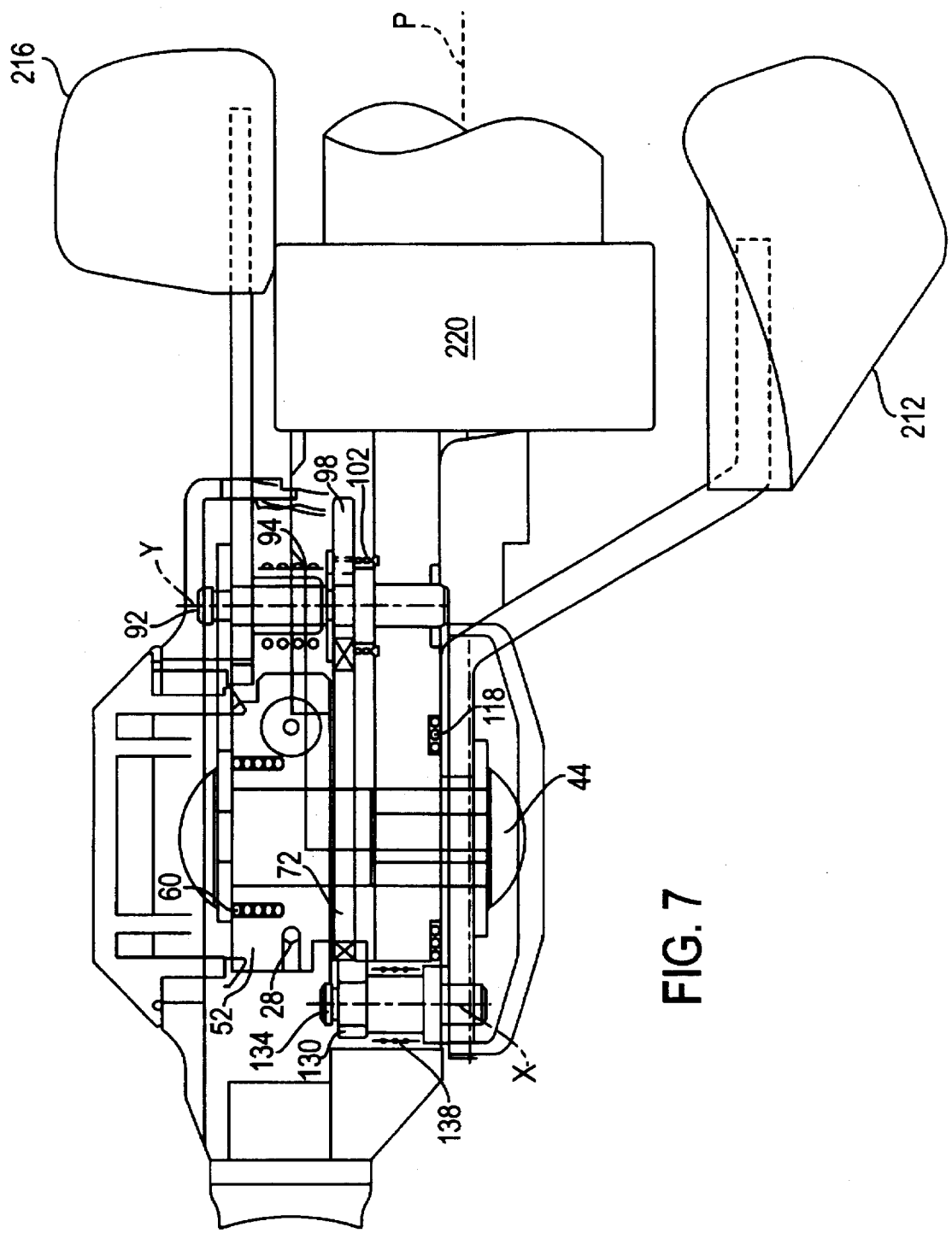

SHIFTING APPARATUS FOR BICYCLES HAVING A BRAKE OPERATING UNIT DISPOSED BETWEEN FIRST AND SECOND SHIFTING LEVERS

BACKGROUND OF THE INVENTION

The present invention is directed to shifting apparatus for bicycles and, more particularly, to a shifting device which is more compact yet easier to use than known shifting devices.

A known indexed shifting apparatus for bicycles is disclosed in U.S. Pat. No. 5,203,213. As shown in FIGS. 3 and 4 of that patent, this type of shifting device includes a support shaft (11) fixed to a bracket (B) mounted on a handlebar; a takeup reel (2) rotatably mounted on the support shaft (11) for alternately pulling and releasing a control cable (I); a first control lever (4) pivotable about the support shaft (11) for causing the takeup reel (2) to pull the control cable (I); and a second control lever (7) for causing the takeup reel (2) to release the control cable (I). The first control lever (4) engages feed teeth (21) on takeup reel (2) through a feed pawl (41) to cause the takeup reel (2) to rotate in the cable pulling direction. The second control lever (7) engages two sets of position retaining teeth (31,61) on takeup reel (2) through two pawls (32,62) to cause the takeup reel to rotate in the cable release direction. The first control lever (4) and the second control lever (7) are both mounted at a position below the handlebar for operation by the index finger and thumb of a cyclist's hand.

Such a bicycle shifting apparatus operates quite satisfactorily for many users. However, the construction of the shifting apparatus does present some disadvantages. For example, the requirement of two pawl mechanisms used to release the control cable increases the cost of manufacture and produces a more complicated and heavier structure. The added components also increase the overall size of the shifting device, either in thickness or diameter. The increased size tends to lower the aesthetic appearance of the shifting device.

Attempts to construct single pawl release mechanisms for indexed bicycle shifting devices with many speeds (e.g., seven or more) have usually failed. One problem arises from the fact that the amount of cable pull for each gear varies. This requires position retaining teeth with varying pitch between adjacent teeth, and the pawl which engages the position retaining teeth must be designed to accommodate the variable pitch. However, as the number of speeds increase, the pitch between the position retaining teeth must either decrease accordingly, or else the size of the shifting device must be increased. Increasing the size of the shifting apparatus is undesirable for obvious reasons. Decreasing the pitch of the position retaining teeth requires a corresponding decrease in the size of the position retaining pawl. However, as the pawl size decreases the thickness of the pawl must necessarily decrease. To accommodate the high operating forces encountered in the typical release mechanism, the pawl must then be fabricated from sintered metal or through some other high cost method.

Furthermore, the location of the shift levers below the handlebar tend to impede high performance operation of the shifting device. Since the handlebar tends to obstruct the view of the shift levers, especially the shift lever operated by the index finger, inexperienced users, users without substantial familiarity with the location of the components, or users without substantial manual dexterity may need to visually assure themselves of the location of the shift levers or grope around before properly locating the shift levers. This wastes time and may annoy such users. Furthermore, the location of the shift levers make it impracticable to shift and brake at the same time. This limitation decreases the ability of racers to compete effectively and impedes the ability of other high performance cyclists who may wish to brake and shift at the same time.

SUMMARY OF THE INVENTION

The present invention is directed to a shifting apparatus for a bicycle which is simpler in construction and more compact than known shifting devices, and which also facilitates high performance riding. Simply stated, the shifting apparatus of the present invention reduces its size by using only a single pawl mechanism to release the control cable. To facilitate operation of the control levers, the control levers may be oriented so that the brake operating unit (for example, either the mounting bracket or the brake lever) is disposed between the control levers. This allows at least one control lever to be in ready view of the cyclist and allows simultaneous operation of the brake and shifting apparatus.

More specifically, in one embodiment of the present invention directed to an apparatus for operating a bicycle transmission shifting device having an operating component for mounting to a bicycle in close proximity to a brake operating unit for alternately pulling and releasing a transmission element, a first lever is mounted to the operating component for movement which causes the operating component to pull the transmission element, and a second lever is mounted to the operating component for movement which causes the operating component to release the transmission element. The first lever and the second lever are mounted to the operating component so that the brake operating unit is disposed between the first lever and the second lever when the shifting device is mounted to the bicycle. If desired, the first lever may be disposed above the brake operating unit where it is read fly visible, and the second lever may be disposed below the brake operating unit in a manner which is also visible to the user.

In order to be able to construct the shifting device with only a single pawl for the release mechanism, the takeup element for the transmission element includes a control member having a plurality of position retaining teeth for engaging the single release pawl, wherein a pitch between at least two pairs of the plurality of position retaining teeth is a constant value. To accommodate the varying cable pull requirements of an index shifting system, the cable winding surface of the takeup element has a nonuniform shape. For some applications this may mean that the winding surface has a progressively increasing radius from a pivot point of the takeup element.

BRIEF DESCRIPTION OF THE DRAWINGS

FIG. 7 is a cross-sectional view of the shifting apparatus shown in FIG. 6.

DETAILED DESCRIPTION OF THE EMBODIMENTS

Figure 1:
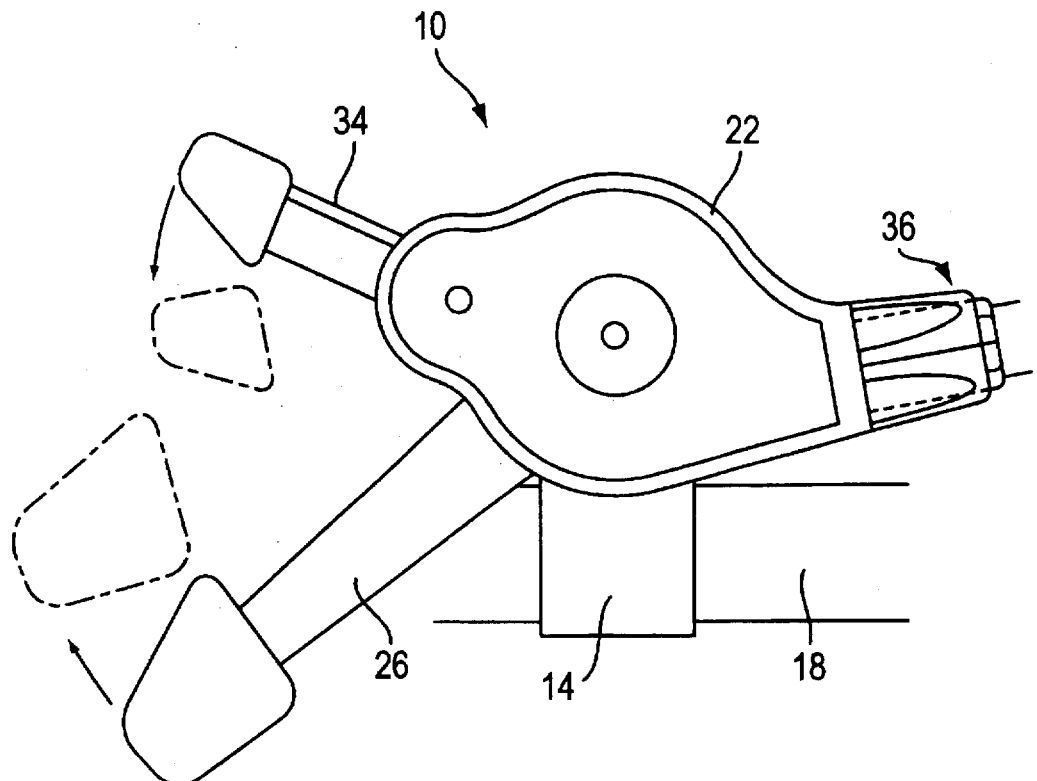
FIG. 1 is a top view of a particular embodiment of a bicycle shifting apparatus according to the present invention.

FIG. 1 is a top view of a particular embodiment of a bicycle shifting apparatus (10) according to the present invention. Shifting apparatus (10) includes a mounting bracket (14) for mounting the shifting apparatus (10) to a handlebar (18) or other structural member of a bicycle; a housing (22) which houses the shifting components; a main lever (26) for causing the shifting apparatus (10) to pull on an inner wire (28, FIG. 2) of a shifting cable assembly (30); and a release lever (34) for causing the shifting apparatus to release the inner wire (28).

Figure 2:
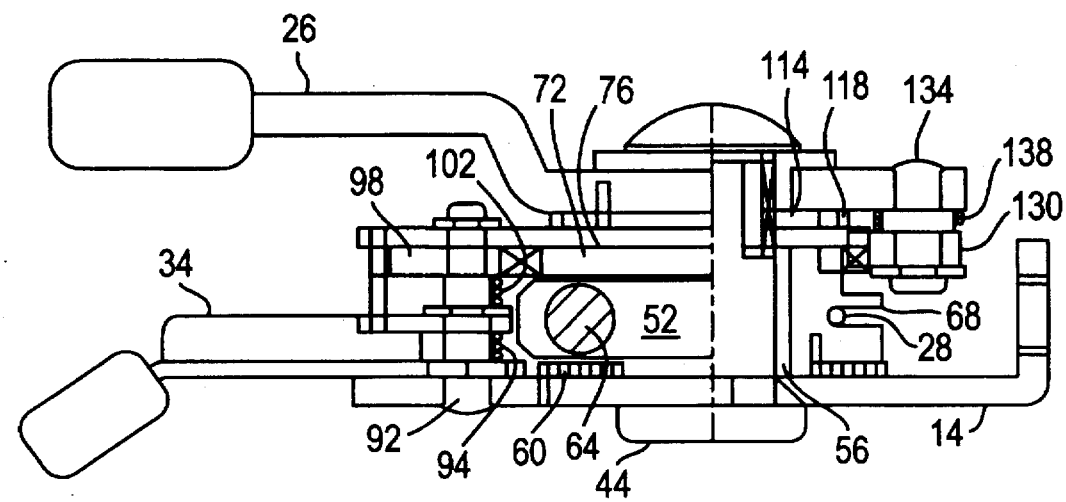
FIG. 2 is cross-sectional view of the shifting apparatus shown in FIG. 1.
Figure 3:
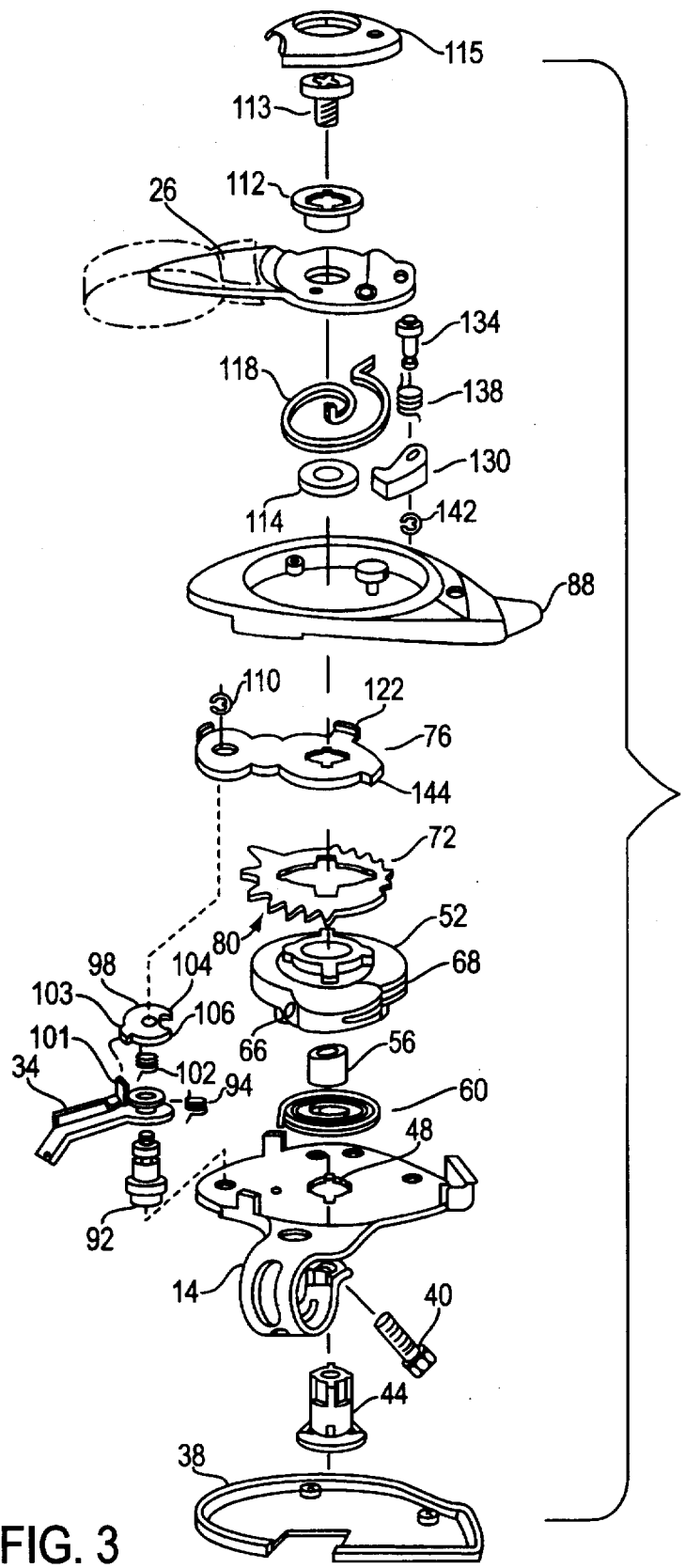
FIG. 3 is an exploded view of the shifting apparatus shown in FIG. 1.

The detailed structure of shifting apparatus (10) is shown in FIGS. 2 and 3. A lower cover (38) is mounted to bracket (14) for forming the lower portion of housing (22), and bracket (14) is adapted to be fastened to handlebar (18) by a mounting screw (40). A main pivot post (44) extends through an opening (48) in mounting bracket (14). A takeup element (52) is rotatably mounted to main pivot post (44) through a bushing (56) and is biased in a cable unwinding direction by a spring (60). A cable retainer (64) is fastened to the end of inner cable (28) and is retained by an abutment (66) formed in takeup element (52) in a well known manner. Inner cable (28) is guided within a cable winding groove (68) during the shifting operation. A control member (72) is fixed to takeup element (52) so as to rotate integrally with it, and a retainer plate (76) is mounted over control member (72). As described in more detail below, control member (72) includes a plurality of position retaining teeth (80A-80G) serially disposed in numerical order, collectively designated as position retaining teeth (80) and a plurality of drive teeth (84A-84G) serially disposed in numerical order, collectively designated as drive teeth (84) for rotating and controlling the position of takeup element (52) in conjunction with main lever (26) and release lever (34). An upper cover (88) is mounted to bracket (14) for forming the upper portion of housing (22).

Release lever (34) is rotatably mounted to a release pivot post (92) which, in turn, is mounted to bracket (14). A spring (94) mounted between release lever (34) and release pivot post (92) for biasing release lever (34) to a home position (shown by a solid line in FIG. 1). A release pawl (98) is also rotatably mounted to release pivot post (92) and is biased in a clockwise direction by a release pawl spring (102). Release pawl (98) includes spaced apart jaws (104,106) for engaging position retaining teeth (80) on control member (72) in a manner discussed below. Release pawl (98) and release pawl spring (102) are retained on release pivot post (92) by a C-clip (110). A release lever tab (101) on release lever (34) cooperates with a pawl tab (103) on release pawl (98) to pivot release pawl counterclockwise in response to counterclockwise movement of release lever (34).

Main lever (26) is rotatably mounted to main pivot post (44) by a bushing (112) and a retainer screw (113). A screw cover (115) is mounted above screw (113). A spacer (114) is disposed between main lever (26) and retainer plate (76), and a spring (118) is mounted between main lever (26) and a spring tab (122) on retainer plate (76) for biasing main lever (26) to a home position (shown by a solid line in FIG. 1). A drive pawl (130) is mounted to a drive pivot post (134) which, in turn, is mounted to main lever (26). Drive pawl (130) is biased in a clockwise direction by a spring (138), and both drive pawl (130) and spring (138) are retained on main pivot post (134) by a C-clip (142).

Figure 4:
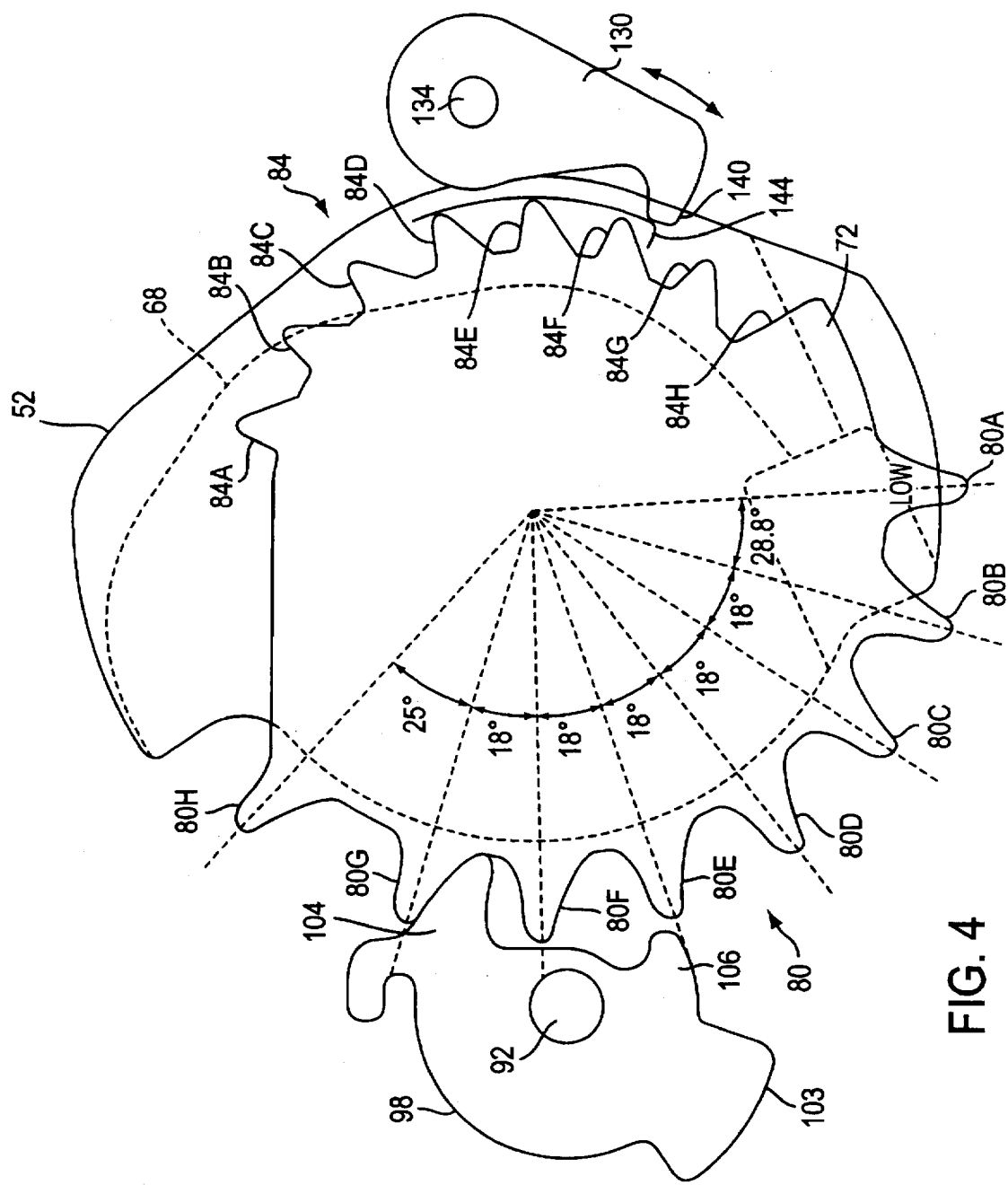
FIG. 4 is a view illustrating the position of the pawls and control member shown in FIG. 3.

FIG. 4 is a view illustrating the detailed structure of takeup element (52) and control member (72), and how the release pawl (98) and main pawl (130) cooperate with position retaining teeth (80) and drive teeth (84), respectively. In this embodiment, there are eight position retaining teeth (80) and eight drive teeth (84) to accommodate an eight speed bicycle transmission. Jaws (104,106) are spaced apart by a distance approximately equal to a distance between adjacent position retaining teeth (80). To facilitate the following discussion, it will be assumed that the bicycle transmission in this example is a derailleur/freewheel combination wherein a derailleur moves a drive chain from one freewheel sprocket to another. Of course, other transmissions could be used, if desired. Since the takeup element (52) is biased in the counterclockwise direction by spring (60), the drive chain is engaged with the smallest freewheel sprocket when the position retaining tooth (80H) abuts against jaw (104) of release pawl (98), the drive chain is engaged with the second smallest freewheel sprocket when the position retaining tooth (80G) abuts against jaw (104) of release pawl (98), and so on until the chain is engaged with the largest freewheel sprocket wherein the position retaining tooth (80A) abuts against jaw (104) of release pawl (98).

When the bicycle transmission is not in the process of being shifted, an engagement projection (140) of drive pawl (130) rests on an abutment (144) of retainer plate (76). When the drive chain is to be shifted to the next largest freewheel sprocket, then main lever (26) is rotated in the clockwise direction to the position shown by broken lines in FIG. 1. This causes drive pawl (130) to move in the direction of the arrow shown in FIG. 4 so that engagement projection (140) of drive pawl (130) moves beyond the abutment (140) on retainer plate (76), drops into the gap between drive tooth (84F) and (84G), and presses against the side of drive tooth (84G). Takeup element (52) and control member (72) then rotates in the clockwise direction. Since release pawl (98) is rotatably mounted to release pivot post (92), release pawl (98) rotates counterclockwise when position retaining tooth (80F) presses against it, thus allowing position retaining tooth (80F) to move to the other side of jaw (104). Thereafter, when main lever (26) is released, spring (118) causes main lever (26) to return to the position shown in solid lines in FIG. 1, and drive pawl (130) retracts to the position shown in FIG. 4. Since takeup element (52) and control member (72) are biased in the counterclockwise direction by spring (60), control member begins to rotate. However, rotation of control member (72) stops when position retaining tooth (80F) abuts against jaw (104), thus maintaining takeup element (52) in the desired position.

Figure 5A:
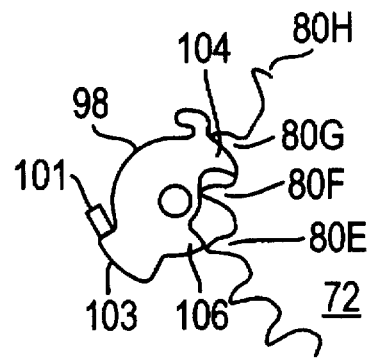
FIGS. 5A–5E illustrate a release operation of the shifting apparatus shown in FIG. 3.
Figure 5B:
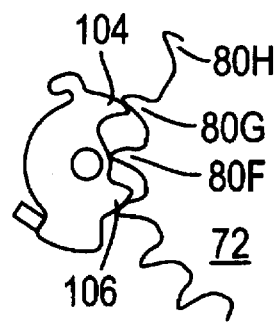
Figure 5C:
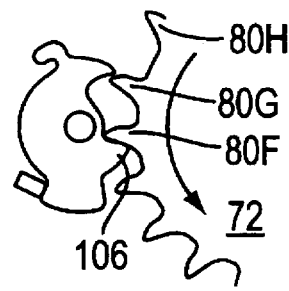
Figure 5D:
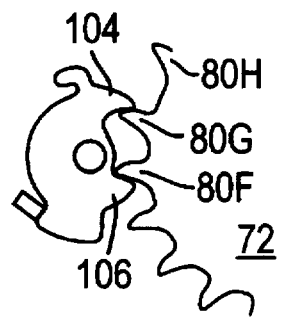
Figure 5E:
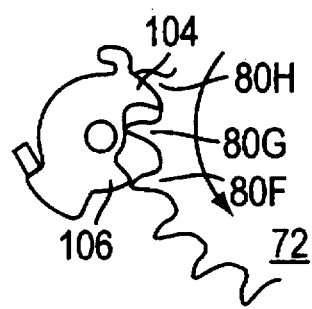

When the chain is to be shifted to a smaller gear, release lever (34) is rotated counterclockwise to the position shown in broken lines in FIG. 1. This causes release lever tab (101) to press against pawl tab (103) to rotate pawl (98) in the counterclockwise direction. FIGS. 5A-5E show the movement of release pawl (98) in the case where the chain is to be shifted from the second smallest sprocket (the position shown in FIG. 4) to the smallest sprocket. Initially, position retaining tooth (80G) abuts against jaw (104) as shown in FIGS. 4 and 5A. As release pawl (98) rotates counterclockwise, jaw (104) moves up the side of position retaining tooth (80G) until the tip of jaw (104) clears the tip of position retaining tooth (80G). When this occurs, control member (72), which is biased in the counterclockwise direction by spring (60), moves counterclockwise until position retaining tooth (80F) abuts against jaw (106) as shown in FIG. 5C. Since engagement projection (140) of drive pawl (130) is resting on abutment (144) of retainer plate (76), drive pawl (130) does not interfere with rotation of control member (72). When release lever (34) is released, spring (94) causes release lever to rotate back to the position shown in solid lines in FIG. 1, thus causing release lever tab (101) to disengage from pawl tab (103) as shown in FIG. 5D. Since release pawl is biased in the clockwise direction by spring (102), release pawl (98) begins to rotate in the clockwise direction, and jaw (106) moves up the side of position retaining tooth (80F) until the tip of jaw (106) clears the lip of position retaining tooth (80F). When this occurs, control member (72), which is biased in the counterclockwise direction by spring (60), moves counterclockwise until position retaining tooth (80H) abuts against jaw (104) as shown in FIG. 5E, thus completing the shifting operation.

When a bicycle transmission is shifted, the amount of displacement of the transmission cable or other transmission element varies for each gear. In a derailleur/freewheel transmission, this is caused in part by the variable distance between successive freewheel gears. In an indexed shifting apparatus, this variable displacement is accommodated by setting the position retaining teeth at different spacing from each other. This means that the release pawl must be constructed to accommodate the widest spacing between the position retaining teeth, thus increasing the size of the shifting apparatus. Furthermore, as the number of speeds increase, the spacing between the position retaining teeth must either decrease accordingly, or else the size of the shifting device must be increased. Decreasing the pitch of the position retaining teeth requires a corresponding decrease in the size of the position retaining pawl. However, as the pawl size decreases the thickness of the pawl must necessarily decrease, particularly the pawl jaws such as jaws (104,106) in release pawl (98). To accommodate the high operating forces encountered in the typical release mechanism, the pawl must then be fabricated from sintered metal or through some other high cost method. As the number of speeds continue to increase, the jaws become too thin, and a single pawl simply cannot be made to satisfactorily perform the function.

The present invention solves this problem by setting a constant pitch (or space) between adjacent position retaining teeth despite the requirement of variable displacement of the transmission cable. In this embodiment, there is a constant pitch between position retaining teeth (80B,80C), (80C, 80D), (80D,80E), (80E,80F), and (80F,80G). For this particular embodiment, the constant pitch is 18°, but this is not critical. The actual pitch will depend on the particular application. To accommodate the requirement of variable displacement of the transmission cable, the winding surface (68) is formed with an irregular shape. In this embodiment, the winding surface (68) has an increasing radius in the counterclockwise direction. Thus, the amount of cable displacement will vary despite the constant pitch of the position retaining teeth, and this variable displacement is accomplished without increasing the overall size of the shifting apparatus. Of course, the actual shape of the winding surface will also depend on the application, and it may either decrease in radius, remain constant, be flat, have a temporary spike, or have some other shape depending upon the application.

Figure 6:
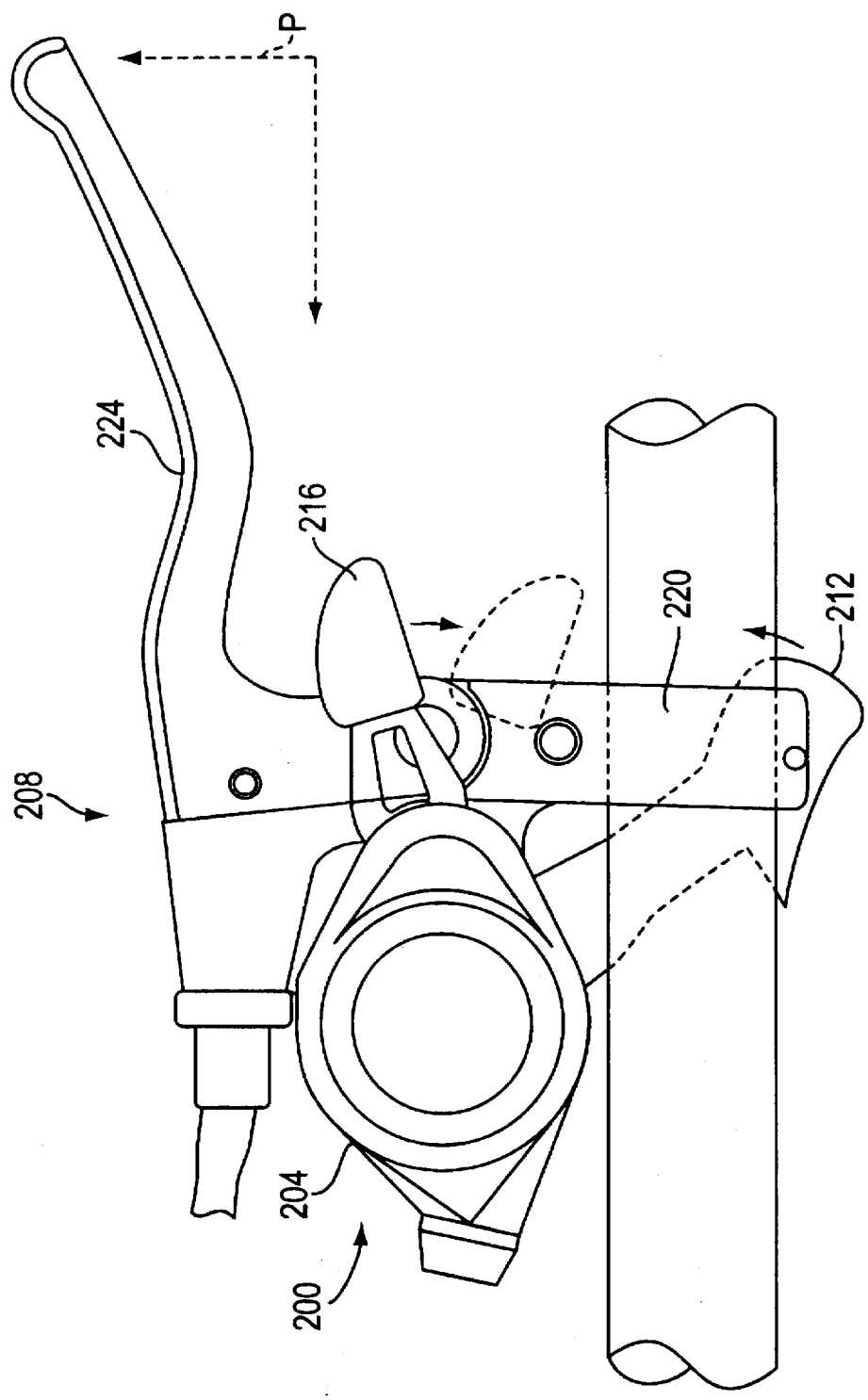
FIG. 6 is a perspective view of another embodiment of a shifting apparatus according to the present invention.

It should be noted that not all pairs of position retaining teeth need to have a constant pitch. For example, there is a pitch of 25° between position retaining teeth (80G,80H), and a pitch of 28.8° between position retaining teeth (80A,80B). The number of pairs of position retaining teeth having a constant pitch depends on the space savings desired, the number of speeds in the bicycle transmission, and other design considerations. In this embodiment, the pitch of the position retaining teeth (80) allow control member (72) to accommodate seven or more speeds, and the control member may have a diameter of 30 mm or less FIG. 6 is a top view of an alternative embodiment of a shifting device (200) according to the present invention. In this embodiment, an operation component (204) of shifting device (206) is mounted in close proximity to a brake operating unit (208) such that a first operating lever (212) is disposed below brake operating unit (208) and a second operating lever (216) is disposed above brake operating unit (208). In this embodiment, first lever (212) functions as the main lever and second lever (216) functions as the release lever, with movement indicated by the arrows, but the functions of the levers and their directions of movement could be reversed or altered as desired. Furthermore, the levers (212,216) could be disposed above or below the brake operating unit (208) at any location. For example, the levers (212,216) could be disposed above or below a mounting bracket (220), a brake lever (224), or any other portion of brake operating unit (208). In this embodiment, shifting device (200) is constructed so that brake lever (228) rotates in a plane P, first operating lever 212 is located below plane P and rotates around an axis X that is substantially perpendicular to plane P, and second operating lever 216 is located above plane P and rotates around an axis Y that is substantially perpendicular to plane P. This configuration makes it possible to shift and brake at the same time, and the levers can be seen quite easily for high performance operation.

FIG. 7 is a cross sectional view of the shifting apparatus shown in FIG. 6. From inspection is should be readily apparent that the construction of operation component (204) is substantially the same as in the first embodiment, except the location of the main lever and the release lever has been reversed. Main pivot post (44) has been lengthened to accommodate bracket (14) which, in this embodiment, has been formed integrally with the brake operating unit (208). The components which correspond to the main components in the first embodiment are numbered the same, so a detailed description of them shall be omitted.

While the above is a description of various embodiments of the present invention, further modifications may be employed without departing from the spirit and scope of the present invention. For example, the embodiment shown in FIGS. 6–7 may use a conventional multiple release pawl operation component. Components shown as separate parts may be integrally formed, and the shape, orientation or location of the components may be altered as desired. Although a wire (28) was shown as a winding transmission element, other transmission elements (chain, belt, etc.) Also may be used.

Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. An apparatus for operating a bicycle transmission shifting device (200) having an operating component (204) for mounting to a bicycle in close proximity to a brake operating unit (208) for alternately pulling and releasing a transmission element (28) comprising:

a first lever (212) mounted to the operating component (204) for movement which causes the operating component (204) to pull the transmission element (28);

a second lever (216) mounted to the operating component (204) for movement which causes the operating component (204) to release the transmission element (28); and wherein the first lever (212) and the second lever (216) are mounted to the operating component (204) so that the brake operating unit (208) is disposed between the first lever (212) and the second lever (216) when the shifting device (200) is mounted to the bicycle;

wherein the brake operating unit (208) includes a brake lever (224) that rotates in a plane (P);

wherein the first lever (212) is located below the plane (P) and rotates around a first axis (X) that is substantially perpendicular to the plane (P); and wherein the second lever (216) is located above the plane (P) and rotates around a second axis (Y) that is substantially perpendicular to the plane (P).

2. The apparatus according to claim 1 wherein the first lever (212) and the second lever (216) are mounted to the operating component (204) so that a mounting bracket (220) of the brake operating unit (208) is disposed between the first lever (212) and the second lever (216) when the shifting device (200) is mounted to the bicycle.

3. The apparatus according to claim 1 wherein the first lever (212) and the second lever (216) are mounted to the operating component (204) so that an operating lever (224) of the brake operating unit (208) is disposed between the first lever (212) and the second lever (216) when the shifting device (200) is mounted to the bicycle.

4. The apparatus according to claim 1 wherein the first lever (212) is mounted to the operating component (204) so that movement of the first lever (212) in a first direction causes the operating component (204) to pull the transmission element (28), wherein the second lever (216) is mounted to the operating component (204) so that movement of the second lever (216) in a second direction causes the operating component (204) to release the transmission element (28), and wherein the first direction is opposite the second direction.

5. A bicycle transmission shifting apparatus comprising:
a fixed member (14);
a takeup element (52) rotatably supported on the fixed member (14) for alternately rotating in a transmission element winding direction and in a transmission element unwinding direction, the takeup element (52) being biased in the transmission element unwinding direction;
a first control member (26) for engaging the takeup element (52) through a one-way transmission unit (72,84,130,144) for rotating the takeup element (52) in the transmission element winding direction:
a position retaining unit (72,80,98) coupled to the takeup element (52) and being switchable between a position retaining state for retaining the takeup element (52) in a selected position and a position releasing state for allowing the takeup element (52) to rotate in the transmission element unwinding direction, the position retaining unit (72,80,98) including only a single position retaining pawl (98) coupled to the takeup element (52);
a second control member (34) for engaging the position retaining unit (72,80,98) for switching the position retaining unit (72,80,98) between the position retaining state and the position releasing state:
a third control member (72) coupled to the takeup element (52) and having a plurality of position retaining teeth (80) for engaging the pawl (98), and wherein a pitch between at least two pairs of the plurality of position retaining teeth (80) is a constant value; and wherein the third control member (72) includes at least seven serially disposed position retaining teeth (80), wherein a pitch between each adjacent pair of a contiguous six of the seven position retaining teeth (80B–80G) is a constant value, and wherein a pitch between a seventh position retaining tooth (80A,80H) and a position retaining tooth (80B, 80G) adjacent to it from the contiguous six position retaining teeth (80B–80G) is different from the constant value.

6. The apparatus according to claim 5 wherein the constant value is approximately equal to 18°.

7. The apparatus according to claim 5 wherein the pitch between the seventh position retaining tooth (80A,80H) and the position retaining tooth (80B,80G) adjacent to it is greater than the constant value.

8. A bicycle transmission shifting apparatus comprising:
a fixed member (14):
a takeup element (52) rotatably supported on the fixed member (14) for alternately rotating in a transmission element winding direction and in a transmission element unwinding direction, the takeup element (52) being biased in the transmission element unwinding direction;
a first control member (26) for engaging the takeup element (52) through a one-way transmission unit (72,84,130,144) for rotating the takeup element (52) in the transmission element winding direction:
a position retaining unit (72,80,98) coupled to the takeup element (52) and being switchable between a position retaining state for retaining the takeup element (52) in a selected position and a position releasing state for allowing the takeup element (52) to rotate in the transmission element unwinding direction, the position retaining unit (72,80,98) including only a single position retaining pawl (98) coupled to the takeup element (52);
a second control member (34) for engaging the position retaining unit (72,80,98) for switching the position retaining unit (72,80,98) between the position retaining state and the position releasing state;
a third control member (72) coupled to the takeup element (52) and having a plurality of position retaining teeth (80) for engaging the pawl (98), and wherein a pitch between at least two pairs of the plurality of position retaining teeth (80) is a constant value; and wherein the third control member (72) includes at least eight position retaining teeth (80) serially disposed in a numerical order, wherein a pitch between each adjacent pair of a middle six of the eight position retaining teeth (80B–80G) is a constant value, wherein a pitch between a first position retaining tooth (80A) and a second position retaining tooth (80B) is different from the constant value, and wherein a pitch between a seventh position retaining tooth (80G) and an eighth position retaining tooth (80H) is different from the constant value.

9. The apparatus according to claim 8 wherein the constant value is approximately equal to 18°.

10. The apparatus according to claim 8 wherein the pitch between the first position retaining tooth (80A) and the second position retaining tooth (80B) is greater than the constant value, and wherein the pitch between the seventh position retaining tooth (80G) and the eighth position retaining tooth (80H) is greater than the constant value.

* * * * *